(12) United States Patent
Ohkubo et al.

(10) Patent No.: US 6,609,993 B2
(45) Date of Patent: Aug. 26, 2003

(54) PLANET CARRIER MECHANISM FOR A PLANETARY GEARSET

(75) Inventors: Masahiro Ohkubo, Soraku-gun (JP); Koji Yoneyama, Osaka (JP)

(73) Assignee: Exedy Corporation, Osaka (JP)

(*) Notice: Subject to any disclaimer, the term of this patent is extended or adjusted under 35 U.S.C. 154(b) by 0 days.

(21) Appl. No.: 10/062,711

(22) Filed: Feb. 5, 2002

(65) Prior Publication Data

US 2002/0115524 A1 Aug. 22, 2002

(30) Foreign Application Priority Data

Feb. 19, 2001 (JP) ........................................ 2001-041210

(51) Int. Cl.[7] .............................................. F16H 57/08
(52) U.S. Cl. ........................................ 475/331; 475/286
(58) Field of Search ................................. 475/286, 331, 475/346, 348

(56) References Cited

U.S. PATENT DOCUMENTS

| | | | | |
|---|---|---|---|---|
| 4,721,014 A | * | 1/1988 | Ohkubo ....................... | 475/331 |
| 5,480,361 A | * | 1/1996 | Murakami et al. ........... | 475/328 |
| 5,480,362 A | * | 1/1996 | Tanaka et al. ................ | 475/346 |
| 5,702,320 A | * | 12/1997 | Brassai et al. ............... | 475/159 |
| 5,928,100 A | * | 7/1999 | Ohtake et al. ............... | 475/159 |
| 5,967,929 A | * | 10/1999 | Matsuoka et al. ........... | 475/159 |

FOREIGN PATENT DOCUMENTS

| | | | | |
|---|---|---|---|---|
| JP | H5-215190 A | | 8/1993 | |
| JP | H5-285745 A | | 11/1993 | |
| JP | 05296216 A | * | 11/1993 | ............. F16B/4/00 |
| JP | H6-17714 B2 | | 3/1994 | |
| JP | H8-226509 A | | 9/1996 | |

* cited by examiner

*Primary Examiner*—Sherry Estremsky
*Assistant Examiner*—Tisha D. Lewis
(74) *Attorney, Agent, or Firm*—Shinjyu Global IP Counselors, LLP

(57) ABSTRACT

A planet carrier mechanism for a planetary gearset is provided to resolve the problems caused by welding during the manufacture of planet carrier mechanisms. The planet carrier mechanism meshes with a sun gear and a ring gear in a planetary gearset and can also rotate about a axial center. It is equipped with a plurality of planet gears 14, a pair of carrier members 16, 17, and a plurality of stud pins 18. The pair of carrier members 16, 17 are disposed on both sides of the planet gears 14 in the axial direction and serve to support the planet gears 14 such that the planet gears can rotate about an axis. The plurality of stud pins 18 is disposed between the plurality of the planet gears 14 with respect to the direction in which the planetary gearset rotates about its axis. Both ends of the stud pins are fixed by caulking to the pair of carrier members 16, 17.

23 Claims, 5 Drawing Sheets ns. More specifically, the present invention relates to a
PLANET CARRIER MECHANISM FOR A PLANETARY GEARSET

BACKGROUND OF THE INVENTION

1. Field of the Invention

The present invention relates to a planet carrier mechanism. More specifically, the present invention relates to a planet carrier mechanism for a planetary gear set.

2. Background Information

A conventional planet carrier in a planetary gearset has a pair of members that has a plurality of planet gears sandwiched therebetween. The pair of members is, for example, disk-shaped plates that are disposed to be parallel to each other.

In the conventional planet carrier just described, the pair of members is fixed to each other by forming a plurality of bent parts that is bent in the axial direction on one of the members of the pair and forming holes in the other member of the pair. The tip of the bent parts are inserted into the holes and welded. The bent parts, which extend between the plurality of planet gears, are contrived so as not to interfere with the planet gears, a sun gear, and a ring gear.

Regarding the type of welding, electron beam welding is generally used because it causes little welding distortion and thus reduces the amount of after-processing required after welding. However, since even electron beam welding causes a slight amount of distortion, after-processing is required on a shaft hole section of a planetary pinion gear because the shaft hole section requires particularly high precision.

In view of the above, there exists a need for a planet carrier mechanism for a planetary gear set that overcomes the above-mentioned problems in the prior art. This invention addresses this need in the prior art as well as other needs, which will become apparent to those skilled in the art from this disclosure.

SUMMARY OF THE INVENTION

An object of the present invention is to resolve the problems caused by welding during the manufacture of planet carrier mechanisms.

A planet carrier mechanism for a planetary gearset in accordance with a first aspect of the present invention meshes with a sun gear and a ring gear and can rotate about a central axis. The planet carrier mechanism is provided with a plurality of planet gears, a pair of carrier members, and a plurality of pin members. The pair of carrier members is disposed on both sides of the planet gears in an axial direction and rotatably support the planet gears. The plurality of pin members is disposed between the plurality of planet gears in the rotational direction of the planetary gearset and are fixed at both ends to the pair of carrier members by caulking.

In this planet carrier mechanism, the pair of carrier members is fixed together by the plurality of pin members. Both ends of each pin member are caulked to the carrier members. Consequently, welding is unnecessary and the problems associated with welding are resolved.

A planet carrier mechanism in accordance with a second aspect of the present invention is the mechanism of the first aspect, wherein a plurality of shafts is further provided for rotatably supporting the plurality of planet gears on the pair of carrier members. Both ends of the shafts are fixed to the pair of carrier members by caulking.

With this planet carrier mechanism, the plurality of pins and the plurality of shafts can be caulked simultaneously, thus reducing the number of manufacturing steps.

A planet carrier mechanism in accordance with a third embodiment of the present invention is the mechanism of the first or second aspects, wherein the pair of carrier members is a pair of plate members that are parallel to each other.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
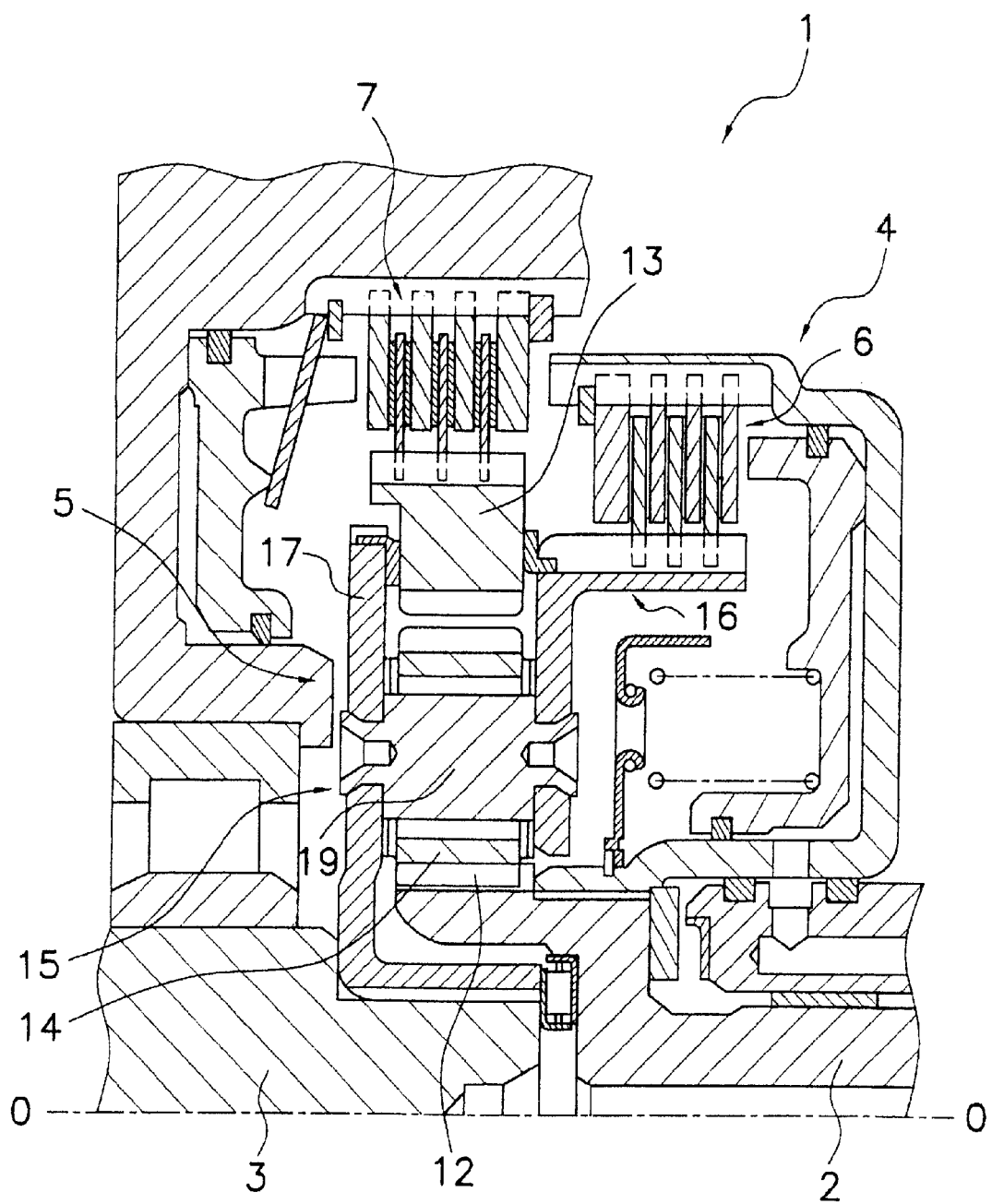
FIG. 1 is a cross-sectional schematic view of a continuously variable transmission forward-reverse rotation device in accordance with a preferred embodiment of the present invention.

FIG. 1 shows a continuously variable transmission forward-reverse rotation device 1 is accordance with a preferred embodiment of the present invention.

The forward-reverse rotation device 1 is disposed between a torque converter (not shown) and a belt-type continuously variable transmission (not shown). An engine (not shown) delivers power to the torque converter. The forward-reverse rotation device 1 transfers torque from an input shaft 2 that extends from the torque converter to an output shaft 3 that extends to the continuously variable transmission. The forward-reverse rotation device 1 also reverses the direction of the drive rotation from the torque converter in order to allow the vehicle to operate in reverse. A line O—O in FIG. 1 represents a rotational axis of the forward-reverse rotation device 1.

The forward-reverse rotation device 1 is equipped with a forward-reverse switching device 4 and a planetary gearset 5 whose power transmission path is switched by means of the forward-reverse switching device 4. The forward-reverse switching device 4 has a forward hydraulic clutch unit 6 to which power is transmitted from the torque converter and a reverse hydraulic brake unit 7 that controls the planetary gearset 5.

Figure 3:
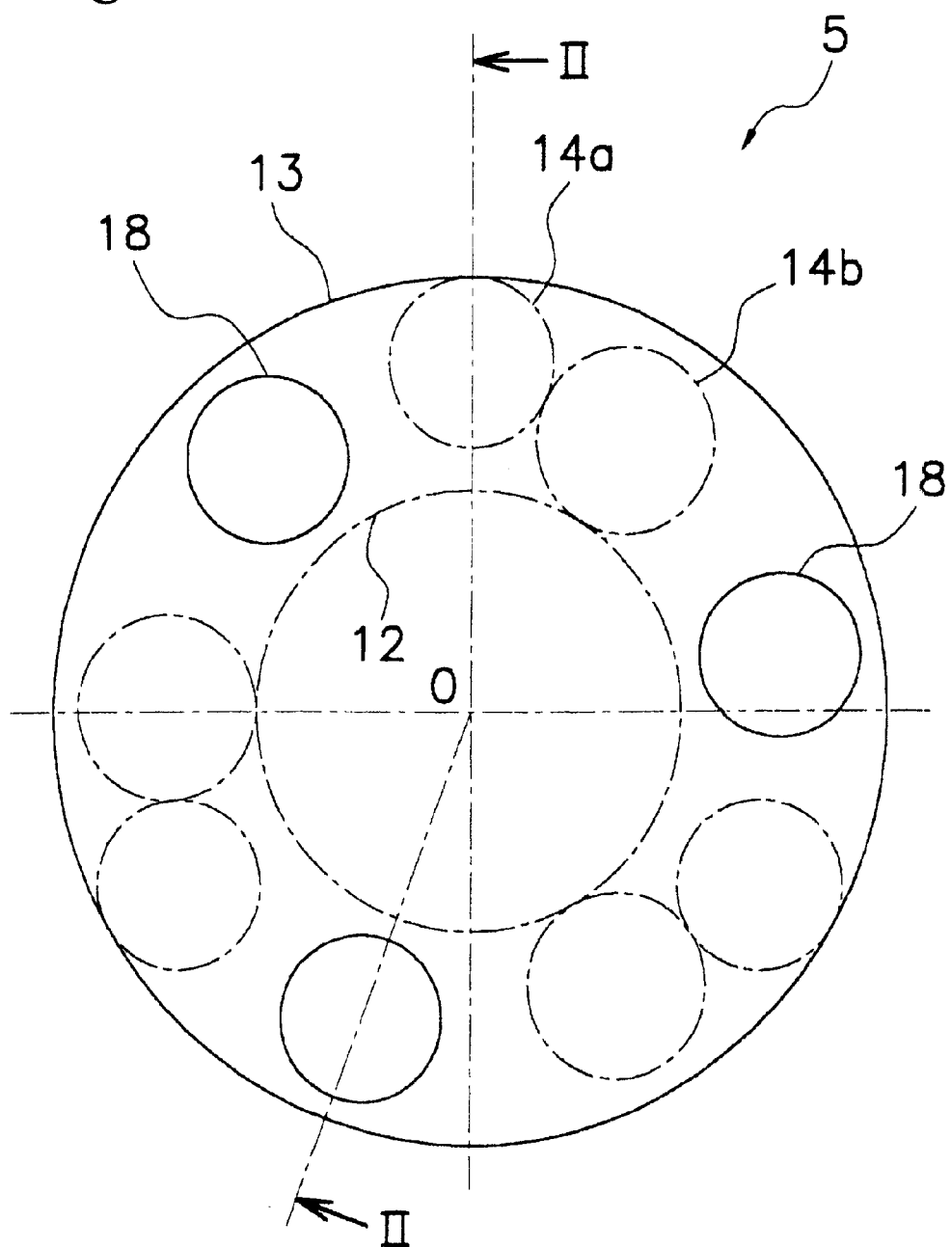
FIG. 3 is a simplified elevational view of the planetary gearset of FIG. 2.

As shown in FIGS. 1 and 3, the planetary gearset 5 is a double pinion type planet gear. The planetary gearset 5 is provided with a sun gear 12, a ring gear 13, a plurality of planet gears 14, and a planet carrier 15. The ring gear 13 is arranged concentrically with the sun gear 12. The plurality of planet gears 14 meshes with the gears 12 and 13. The planet carrier 15 rotatably supports the planet gears 14. The plurality of planet gears 14 and the planet carrier 15 preferably constitute the entire planet carrier mechanism.

There are preferably a total of six planet gears 14 arranged into three pairs. Two planet gears of each pair mesh together.

One planet gear 14a of each pair meshes with the ring gear 13 and the other planet gear 14b meshes with the sun gear 12. Additionally, a total of three stud pins 18 are disposed between each pair of planet gears 14 in the circumferential direction (in the direction of rotation about rotational axis O—O).

Figure 2:
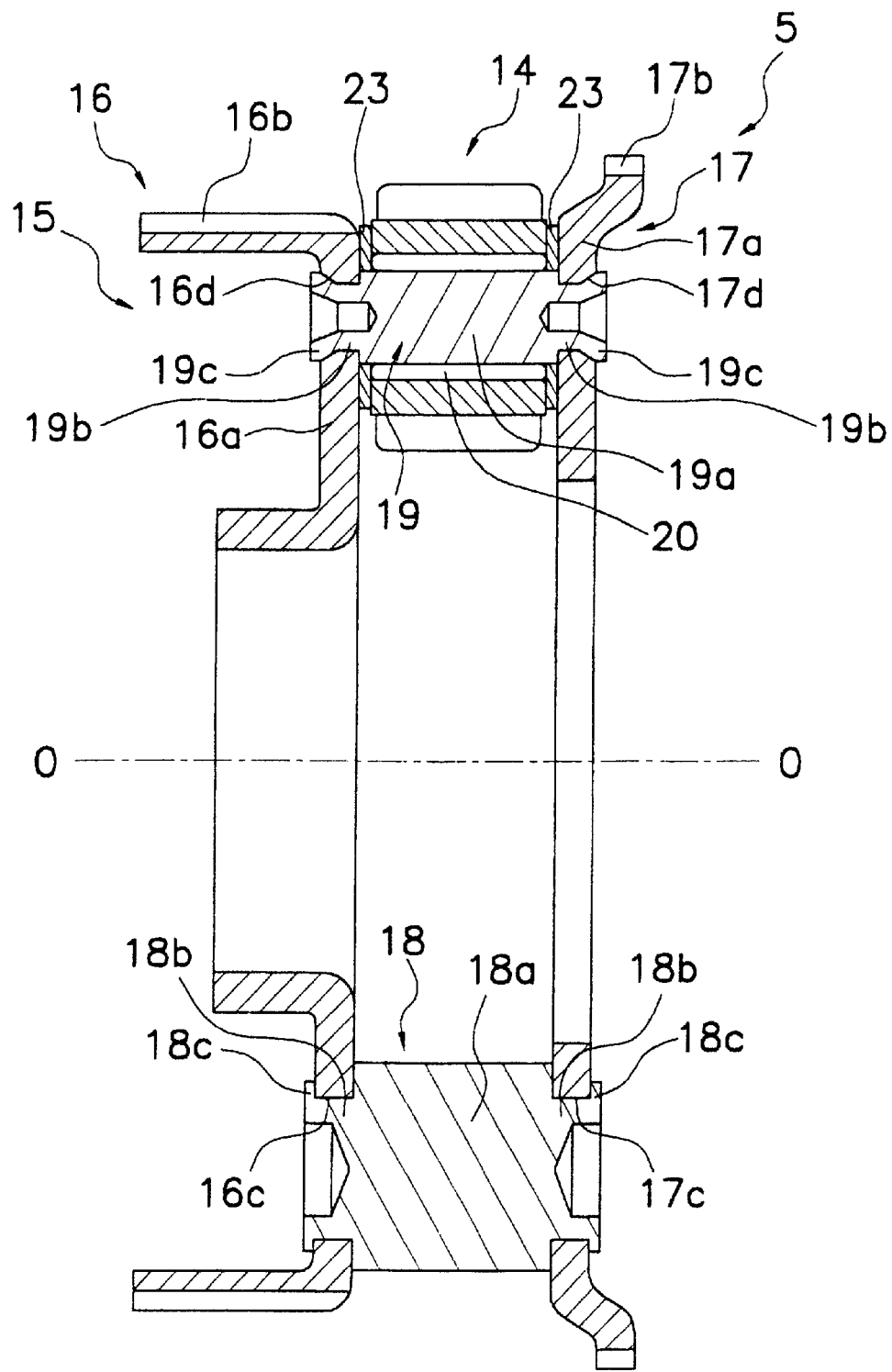
FIG. 2 is a cross-sectional view illustrating planet gears and a planet carrier of a planetary gearset of the device of FIG. 1.

The planet carrier 15 rotatably supports the plurality of planet gears 14. As seen in FIG. 2, the planet carrier 15 chiefly has a pair of carrier members 16 and 17 and the stud pins 18 for fixing the two carrier members 16, 17 together. The carrier members 16, 17 are a pair of disk-shaped plate members disposed on both sides of the planet gears 14 in the axial direction. In the following explanation, the respective surfaces of carrier members 16, 17 that face each other (face inward in the axial direction) are called "inward surfaces" and the respective surfaces that face away from each other (face outward in the axial direction) are called "outward surfaces." Each of the carrier members 16, 17 has a disk-shaped main body section 16a, 17a and a coupling section 16b, 17b formed integrally with the external circumferential edge of the main body section. The coupling section 16b is a cylindrical section that supports the clutch plates of the forward clutch 6. A plurality of first holes 16c, 17c, preferably six, for fixing the stud pins 18 is formed in the main body sections 16a, 17a at equal intervals in the circumferential direction. The first holes 16c, 17c are circular holes that extend straight in the axial direction. A plurality of second holes 16d, 17d, preferably three, is formed circumferentially between each pair of the first holes 16c, 17c in the main body sections 16a, 17a. The second holes 16d, 17d are circular when viewed in an direction parallel to the axis of rotation. Further, when viewed from a direction perpendicular to the axis of rotation, the second holes 16d, 17d are straight on the inward side of their respective carrier members and tapered on the outward side so as to become larger in diameter as they approach the outward surface in the axial direction. In other words, a caulking receiving section is formed in rim section of the opening of the second holes 16d, 17d.

As previously mentioned, the pair of first holes 16c, 17c and the pair of second holes 16d, 17d are formed in carrier members 16 and 17 alternately in the circumferential direction.

The stud pins 18 fix the pair of carriers 16, 17 together. The stud pins 18 are roughly rod-shaped. The stud pins 18 and have a main body section 18a, neck sections 18b, and head sections 18c. The neck sections 18b are formed on both axially opposite ends of each stud pin 18. The head sections 18c are formed on each neck section 18b. The end faces of the main body section 18a touch the inward surfaces of the carrier members 16, 17. As a result, the two carrier members 16, 17 are restricted from approaching each other. The neck sections 18b of each stud pin 18 are smaller in diameter than the main body section 18a and are inserted into the first holes 16c, 17c in the carrier members 16, 17. The head sections 18c are also larger in diameter than the neck sections 18b and touch against the outward surface of each carrier member 16, 17. Consequently, carrier members 16, 17 will not separate from the stud pins 18 in the axial direction.

The head sections 18c are formed in a caulking process that uses a caulking device that includes a punch. More specifically, the tip faces of the stud pins 18 have a caulking hole and the surrounding portion touches against the outward side of the carrier members 16, 17. There is no limitation on the name and specific structure of the stud pins, so long as they are members that can function as stud pins (i.e., members that have a prescribed length in the axial direction and can be caulked at both ends).

The planet gears 14 are rotatably supported on the pair of carrier members 16, 17 using a plurality of shafts 19, preferably six. The shafts 19 are roughly rod-shaped members that extend in the axial direction and are disposed inside center holes of the planet gears 14. The planet gears 14 are supported on the shafts 19 with needle bearings 20 such that they can rotate freely.

The shafts 19 are roughly rod-shaped. Each shaft 19 has a main body section 19a, neck sections 19b, and head sections 19c. The neck sections 19b are formed on both axially opposite ends of each shaft 19. The head sections 19c are formed on each neck section 19b. The end faces of the main body section 19a touch the inward surfaces of the carrier members 16, 17. As a result, the two carrier members 16, 17 are restricted from approaching each other. The neck sections 19b of each shaft 19 are smaller in diameter than the main body section 19a and are inserted into the straight section of the second holes 16d, 17d on the inward side of carrier members 16, 17. The head sections 19c touch against the tapered surfaces of the second holes 16d, 17d such that the head sections 19c press against the second holes 16d, 17d. Consequently, the carrier members 16, 17 will not separate from the shafts 19.

The head sections 19c are formed in a caulking process that uses a caulking device that includes a punch. More specifically, the tip faces of the shafts 19 have a caulking hole and the surrounding portion is pressed and spread outward so as to wedge into the caulking receiving portion of the second holes 16d, 17d.

Washers 23 are disposed between each planet gear 14 and the carrier members 16, 17. The washers 23 are arranged around both ends of the main body section 19a of each shaft 19.

When the planet carrier 15 is assembled, the head sections of the stud pins 18 and the head sections of the shafts 19 are caulked at the same time. Thus the assembly of the planet carrier 15 is simplified and can be completed simultaneously in one step.

(2) Effect

The effects obtained when the present invention is used are described.

The number of stud pins are greater when compared to conventional mechanisms but welding and post-welding processing steps are unnecessary. Conventional welding has caused the cost of planet carriers to be high. Even when it is necessary for the pair of carrier members to have joints for coupling with other members, there is no need for the carrier members to be divided into two separate pieces. When portions of one of the carrier members were bent and fixed to the other carrier member in a conventional manner, it was not possible to provide a coupling section for coupling with other members directly on the carrier member having the bent portions. Consequently, such coupling members were welded to the carrier member.

Since welding has been eliminated, there are no welding defects or welding distortion and the quality is stable.

The stud pins can be made smaller in the circumferential direction of the planetary gearset and, consequently, the number of planet gears can be increased. Since the transfer torque capacity of the gears increases in accordance with the increase in the number of gears, the face width of the teeth of the planet gears can be reduced. As a result, the entire device becomes more compact.

In the prior art, portions of one of the two carrier members were bent to form coupling parts, but since the coupling parts were made from a plate, a prescribed width was required in the circumferential direction in order to ensure sufficient strength. Consequently, the number of planet gears was restricted.

Alternate Embodiment

Figure 4:
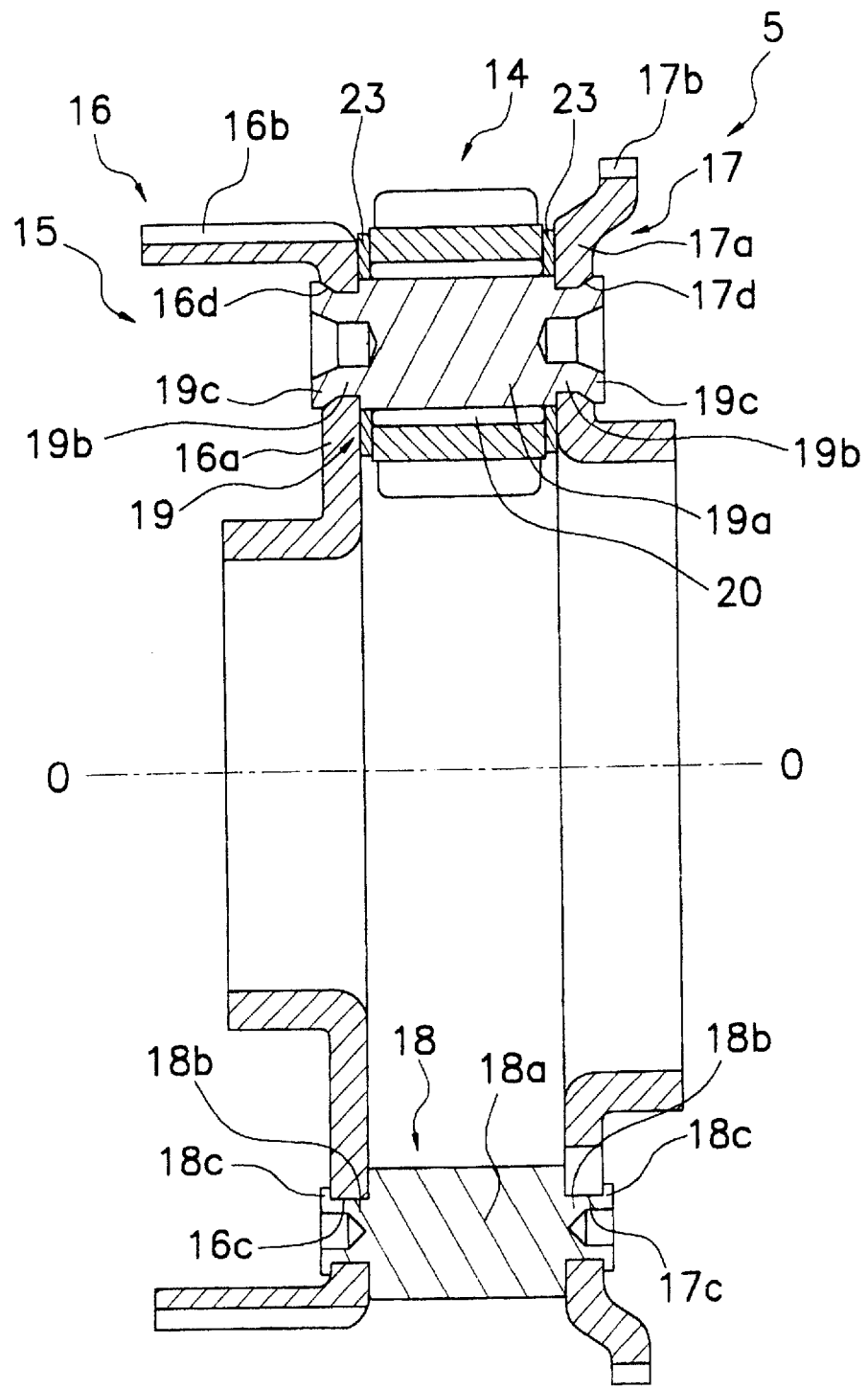
FIG. 4 is a cross-sectional view corresponding to FIG. 2 illustrating planet gears and a planet carrier in accordance with an alternate embodiment of the present invention in a planetary gearset.
Figure 5:
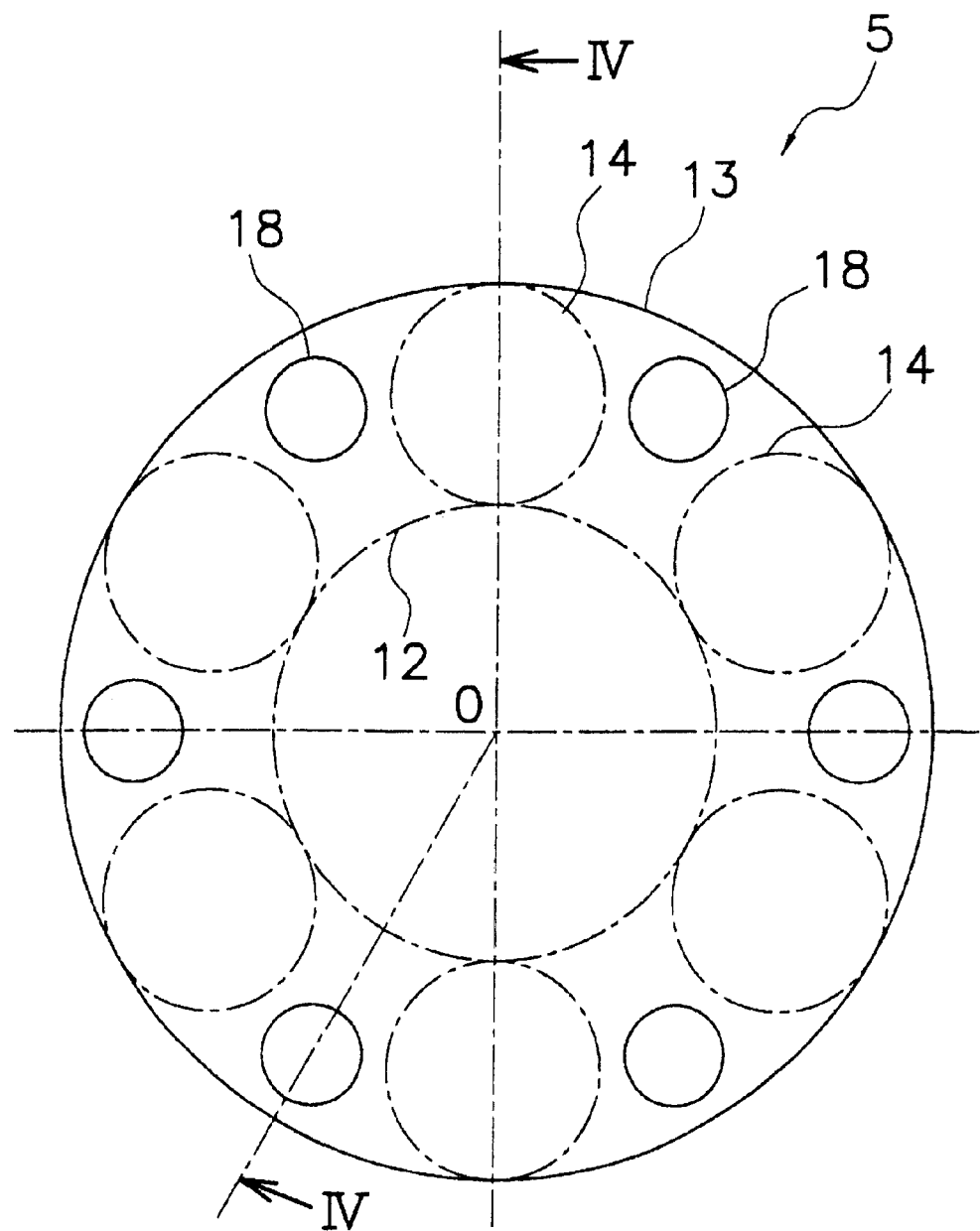
FIG. 5 is a simplified elevational view of the planetary gearset of FIG. 4.

Referring now to FIGS. 4 and 5, a planet carrier mechanism in accordance with the an alternate embodiment of the present invention will now be discussed. In view of the similarites between this embodiment and previous embodiment, discussed above, the components or parts of this embodiment that have the same function of the corresponding components or parts of the previous embodiment are being given the identical reference numerals. Moreover, the explanations of components or parts and the operations of this embodiment that are similar to components or parts and the operations of the first embodiment will be omitted. Only components and operations of this embodiment that are different in structure and function from the previous embodiment will be explained herein. In other words, an alternate embodiment provides a planetary gearset 5 having single pinion planet gears. The basic structure of the planetary gearset 5 is similar to the previous embodiment. Only the differences are discussed here.

As seen in FIGS. 4 and 5 there are preferably a total of six planet gears 14 arranged at equal intervals in a rotation direction about the center rotational axis O—O of the planetary gearset 5. In short, there is a gap between each planet gear 14 and the planet gears adjacent thereto in the circumferential direction. Each planet gear 14 meshes with the sun gear 12 and the ring gear 13.

Except for their smaller diameter, the stud pins 18 in this embodiment have substantially the same shape and function as the stud pins in the previous embodiment.

As previously mentioned, the pair of first holes 16c, 17c and the pair of second holes 16d, 17d are formed in carrier members 16 and 17 alternately in the circumferential direction.

This embodiment provides similar effects to those of the previous embodiment.

(3) Other Embodiments

A planet carrier mechanism in accordance with the present invention can also be used in other types of planetary gearsets.

Effects of the Invention

In a planet carrier mechanism in accordance with the present invention, the pair of carrier members is fixed together by a plurality of pin members whose ends are caulked to the carrier members. Therefore, welding is not necessary and the problems associated with welding are resolved.

The terms of degree such as "substantially," "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A planet carrier mechanism for a planetary gearset that meshes with a sun gear and a ring gear and can rotate about a central axis comprising:
   a plurality of planet gears;
   a pair of carrier members being disposed on axially opposite sides of said plurality of planet gears, said pair of carrier members being configured to support rotatably said planet gears; and
   a plurality of pin members being disposed between said plurality of planet gears in a rotational direction of the planetary gearset and fixed to said pair of carrier members by caulking, said planetary gears being non-interposable by said plurality of pin members and the sun gear or ring gear in a radial direction.

2. The planet carrier mechanism according to claim 1, wherein a plurality of shafts is provided to support rotatably at least one of said plurality of planet gears on said pair of carrier members, and axially opposite ends of said shafts are fixed to said pair of carrier members by caulking.

3. The planet carrier mechanism according to claim 1, wherein said pair of carrier members is a pair of plate members that are arranged parallel to each other.

4. The planet carrier mechanism according to claim 2, wherein said pair of carrier members is a pair of plate members that are arranged parallel to each other.

5. A forward reverse rotation device comprising:
   a forward reverse switching device;
   a planetary gearset having,
      a sun gear;
      a ring gear being concentrically arranged with said sun gear;
      a plurality of planet gears being arranged between said sun gear and said ring gear;
      a planet carrier being configured to support rotatably said plurality of planet gears; and
      a plurality of pin members being disposed between said plurality of planet gears in a rotational direction of the planetary gearset and fixed to said carrier member by caulking, said planetary gears being non-interposable by said plurality of pin members and said sun gear or said ring gear in a radial direction.

6. The forward reverse rotation device according to claim 5, wherein a plurality of shafts is further provided to support rotatably said plurality of planet gears on said planet carrier, and ends of said shafts are fixed to said planet carrier by caulking.

7. The forward reverse rotation device according to claim 5, wherein said planet carrier comprises a first plate member and a second plate member that are arranged parallel to each other.

8. The forward reverse rotation device according to claim 6, wherein said planet carrier comprises a first plate member and a second plate member that are arranged parallel to each other.

9. The forward reverse rotation device according to claim 5, wherein a first plate member and a second plate member of said planet carrier are formed with a plurality of planet gear apertures configured to contact a plurality of shafts to support rotatably said plurality of planet gears, and a plurality of pin member apertures configured to contact said plurality of pin members.

10. The forward-reverse device according to claim 9, wherein said plurality of shafts has a body section that is arranged inside a central aperture of said plurality of planet gears.

11. The forward-reverse device according to claim 9, wherein said plurality of planet gear apertures extends in an axial direction, each of said planet gear apertures having a straight part that extends substantially parallel to an axis of rotation and a tapered part that tapers outward from said straight part.

12. The forward-reverse device according to claim 11, wherein said straight part is arranged between said tapered part and said planet gear.

13. A power transmission unit comprising:
a torque converter;
a belt-type continuously variable transmission; and
a forward reverse rotation device having,
   a forward reverse switching device,
   a planetary gearset having,
   a sun gear;
   a ring gear being concentrically arranged with said sun gear;
   a plurality of planet gears being arranged between said sun gear and said ring gear;
   a planet carrier being configured to support rotatably said plurality of planet gears; and
   a plurality of pin members being disposed between said plurality of planet gears in a rotational direction of the planetary gearset and fixed to said carrier member by caulking, said planetary gears being non-interposable by said plurality of pin members and said sun gear or said ring gear in a radial direction.

14. The power transmission unit according to claim 13, wherein a plurality of shafts is further provided to support rotatably said plurality of planet gears on said planet carrier, and an end of said shafts are fixed to said planet carrier by caulking.

15. The power transmission unit according to claim 13, wherein said planet carrier comprises a first plate member and a second plate member that are arranged parallel to each other.

16. The power transmission unit according to claim 14, wherein said planet carrier comprises a first plate member and a second plate member that are arranged parallel to each other.

17. The power transmission unit according to claim 13, wherein a first plate member and a second plate member of said planet carrier are formed with a plurality of planet gear apertures configured to contact a plurality of shafts to support rotatably said plurality of planet gears, and a plurality of pin member apertures configured to contact said plurality of pin members.

18. The power transmission unit according to claim 17, wherein said plurality of shafts has a body section that is arranged inside a central aperture of said plurality of planet gears.

19. The power transmission unit according to claim 18, wherein said plurality of planet gear apertures extends in an axial direction, each of said planet gear apertures having a straight part that extends substantially parallel to an axis of rotation and a tapered part that tapers outward from said straight part.

20. The power transmission unit according to claim 19, wherein said straight part is arranged between said tapered part and said planet gear.

21. The planet carrier mechanism according to claim 1, wherein each of said plurality of pin members comprises,
   a main body section disposed between said pair of carrier members,
   a pair of neck sections that extend from said main body, said neck sections are disposed in apertures formed in said pair of carrier members, and
   a pair of head sections that extend from said neck sections in a direction substantially perpendicular to an axis of said rotational direction, said main bodies are arranged to contact said pair of carrier members.

22. The forward reverse rotation device according to claim 5, wherein each of said plurality of pin members comprises,
   a main body section disposed on a first axial side of said planet carrier,
   a neck section that extends from said main body, said neck section is disposed in an aperture formed in said planet carrier, and
   a section that extends from said neck section in a direction substantially perpendicular to an axis of said rotational direction, said main body is arranged to contact said planet carrier.

23. The power transmission unit according to claim 13, wherein each of said plurality of pin members comprises,
   a main body section disposed on a first axial side of said planet carrier,
   a neck section that extends from said main body, said neck section is disposed in an aperture formed in said planet carrier, and
   a section that extends from said neck section in a direction substantially perpendicular to an axis of said rotational direction, said main body is arranged to contact said planet carrier.

* * * * *